UNITED STATES PATENT OFFICE.

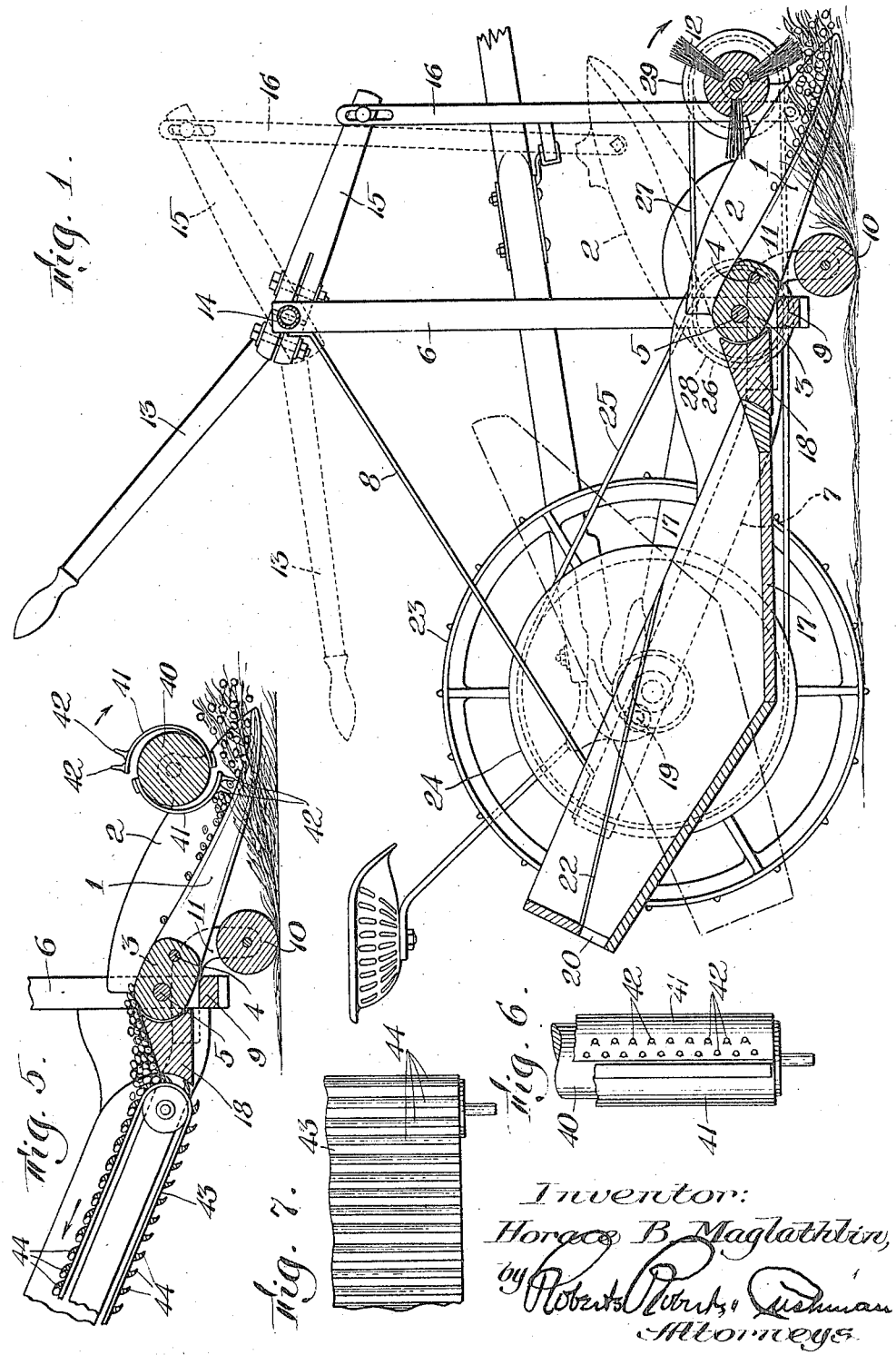

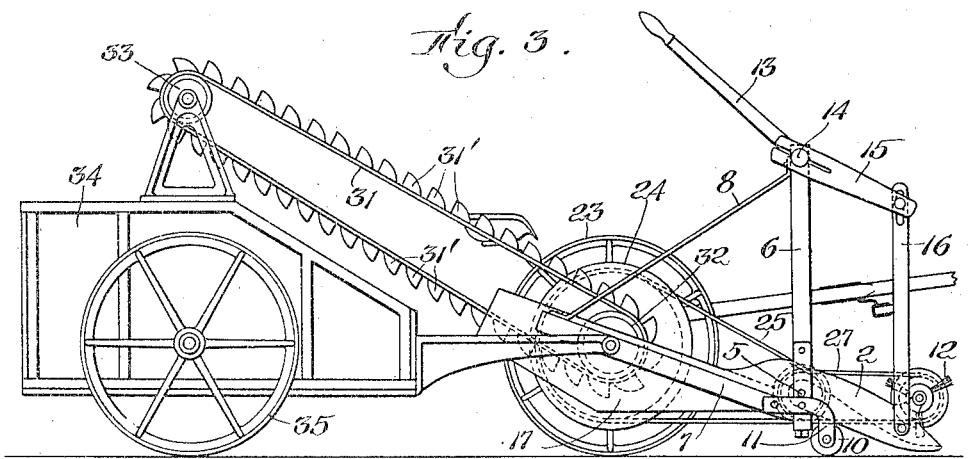
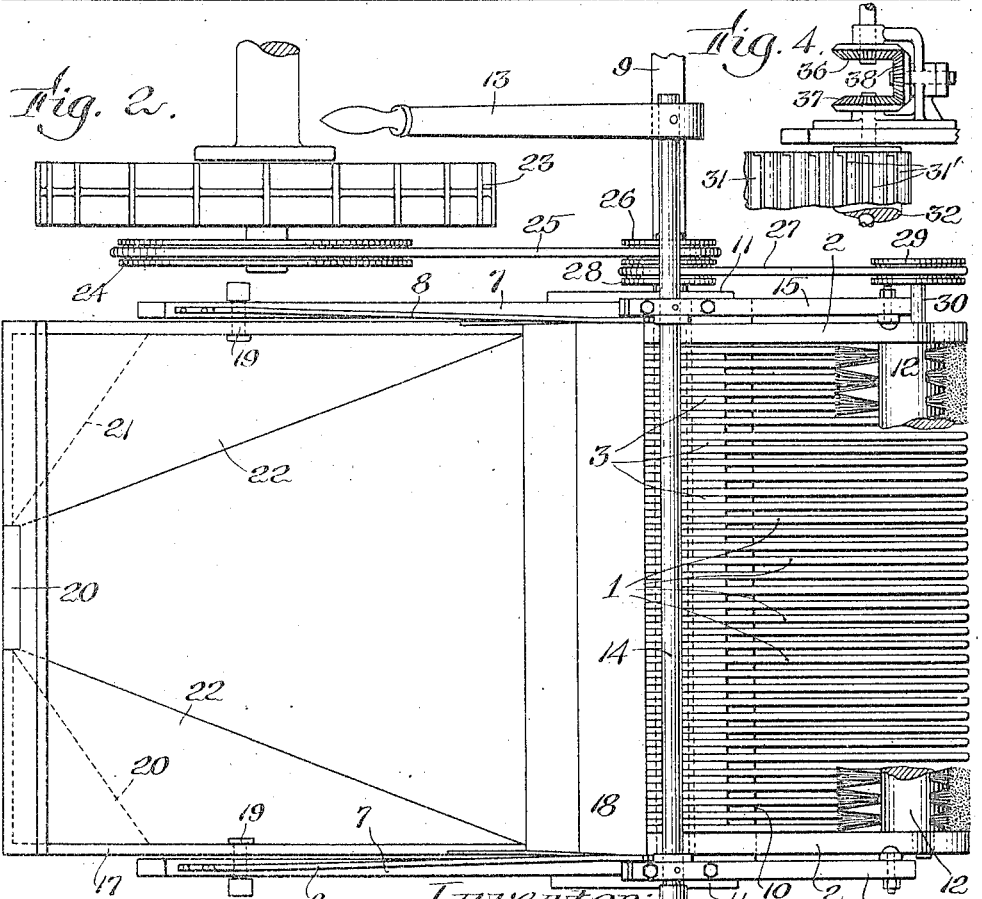

HORACE B. MAGLATHLIN, OF KINGSTON, MASSACHUSETTS, ASSIGNOR, BY DIRECT AND MESNE ASSIGNMENTS, TO CRANBERRY HARVESTER COMPANY, OF BOSTON, MASSACHUSETTS, A CORPORATION OF MASSACHUSETTS.

CRANBERRY-HARVESTING APPARATUS.

1,233,089.     Specification of Letters Patent.     Patented July 10, 1917.

Application filed October 18, 1916. Serial No. 126,407.

*To all whom it may concern:*

Be it known that I, HORACE B. MAGLATHLIN, a citizen of the United States, and resident of Kingston, in the county of Plymouth and State of Massachusetts, have invented new and useful Improvements in Cranberry-Harvesting Apparatus, of which the following is a specification.

This invention relates to a machine for harvesting cranberries. It has hitherto been the invariable practice, so far as I am aware, to pick cranberries by hand with the aid of a hand scoop, the bottom of which is composed of a series of teeth spaced apart sufficiently to permit the vines to pass between them but not the cranberries, which will remain in the scoop, when the article is passed through the vines in a manner resembling combing. The object of the present invention is to provide a cranberry picking and harvesting machine which may be driven by horse power or motor power and capable of far more rapid and thorough work than has been possible with hand work.

In the accompanying drawings which illustrate several embodiments of the invention,—

Figure 1 is a longitudinal section of a cranberry harvesting machine containing the invention;

Fig. 2 is a plan view, partly broken away, of the machine shown in Fig. 1;

Fig. 3 is a side elevation of a machine similar to that shown in Figs. 1 and 2, but containing a modification and addition;

Fig. 4 is a detail in plan view showing the driving connection for the conveyer shown in Fig. 3;

Fig. 5 is a longitudinal section illustrating further modifications of the invention;

Fig. 6 is a fragmentary plan view of the brush shown in Fig. 6; and

Fig. 7 is a fragmentary plan view of the conveyer shown in Fig. 5.

The machine shown in the drawings is designed as a horse-drawn machine, although it will be understood that it might be propelled by a mechanical tractor or by a motor in the carriage itself. The machine is connected to a suitable carriage, only parts of which are shown, having a frame and running gear, and is preferably offset at one side of the carriage so that neither the horse nor the tractor nor the machine itself will run over the stretch of the field on which the berries remain unpicked.

At the forward end of the machine is the cranberry picker proper, which consists of a scoop having its bottom in the form of a series of forwardly pointing teeth 1 suitably spaced apart to permit the vines but not the berries to pass between them. The side walls 2 constitute the sides of the scoop. The teeth 1 are preferably made of wood and are spaced apart by the spacing blocks 3 at the bases of the teeth. The teeth, the spacing blocks and the side walls are bound together and are held in position by a tie rod 4 extending through the several parts, and shaft 5, on which the scoop is pivoted to swing upward and downward. The shaft 5 is mounted on a pair of side frames consisting of upright frame members 6, lengthwise extending members 7, and brace members 8. The members 6 and 7 are bolted to a cross bar 9 which is a part of the frame of the carriage itself and extends laterally from the carriage and serves as the connection by which the harvesting mechanism is secured to the carriage.

A roller 10, extending underneath the scoop well to the rear of the forward edge of the scoop and preferably in proximity of the bases of the teeth 1, is journaled at its ends on brackets 11 which are secured to the side frame members 6, 7. The roller 10 runs idly on the ground, and bears upon and firmly holds the vines under the weight of the machine as the teeth of the scoop strip off the berries in its forward movement. The downward pressure on the roller 10 is enhanced by the pull of the plants passing between the teeth which is transmitted to the roller through the rigid brackets 11. A rotary brush 12 is journaled between the side walls 2 of the scoop and is positively driven in the direction of the arrow in Fig. 1, by belt and pulley connections hereinafter described, to sweep the cranberries rearwardly as they are stripped off in the scoop. The scoop together with the brush may be elevated to inoperative position, or for the purpose of discharging its contents rearwardly, as shown in dotted lines in Fig. 1, whenever desired, by means of the hand lever 13, which is secured to a cross-shaft 14 journaled in the upper ends of the upright frame members 6. Two lever arms 15 are also fixed to shaft 14, one at each side of the machine. The forward ends of arms 15 are pivotally connected by means of links 16 to the forward ends of the side walls 2 of the scoop so that by depressing the hand lever 13 the forward end of the scoop will be swung upwardly on its shaft 5.

At the rear of the scoop is a hopper into which the berries pass rearwardly from the scoop. In the form shown in Figs. 1 and 2, the hopper consists of a box or tray 17 which may be of wood, sheet metal, or textile fabric fastened to a suitable frame. The hopper is shown in its normal operative position in full lines in Fig. 1, and receives the berries from the chute or inclined floor strip 18 between the forward edge of the hopper and the rear edge of the scoop. The hopper is pivoted at 19, 19, to the side frame members 7 so that it may be rotated rearwardly as shown in broken lines in Fig. 1, to permit its contents to be dumped out rearwardly through the opening 20. It may be provided with the inclined walls 21, 21, to direct the contents toward the outlet opening 20 and may also have a suitable cover or covers 22 arranged above the level of the outlet opening 20 to aid in directing the contents toward the outlet.

The brush 12 is driven from the wheel 23 of the carriage on the side nearest the harvesting mechanism, through a pulley 24 secured to the wheel axle, belt 25 connecting pulley 24 and pulley 26, and belt 27 connecting pulley 28 and pulley 29. Pulleys 26 and 28 are fixed to a common shaft journaled on the frame, and pulley 29 is fixed to the brush shaft 30. The axis of pulleys 26 and 28 is concentric with the pivot shaft 5 on which the scoop swings, so that the driving belts from the wheel shaft to the brush shaft will not be affected or become dislodged no matter in what position the scoop and brush may be.

The apparatus shown in Fig. 3 is substantially the same as that already described, save that the hopper 17 instead of being journaled to swing and dump its contents, may be fixed, and is open at the rear and top to receive the conveyer belt 31. The belt 31, provided with a series of scoops or buckets 31', runs at its lower end over a roller 32 which is journaled concentrically with the carriage wheel 23, and at the upper end over the roller 33 journaled on a receiver 34 which is in the form of a body of a truck running on the wheels 35 attached to the rear end of the machine frame.

The conveyer 31 is driven in the opposite direction to the direction of rotation of the carriage wheels 23 by means of the bevel gear connection shown in Fig. 4, wherein the bevel gear 36 is fixed to the wheel axis, the bevel gear 37 is fixed to the conveyer actuating roller 32, and said two bevel gears are connected by an intermediate bevel gear 38. The rotation of the carriage wheel 23 thereby causes the conveyer 31 to travel in the opposite direction to the wheel 23, that is, with the upper stretch of the conveyer belt moving upwardly and rearwardly.

In operation the buckets 31' on the under stretch of the conveyer move downwardly and into the hopper 17, pick up the berries accumulated therein, convey them upwardly on the upper stretch of the conveyer, and dump them into the receiver 34.

In the modification shown in Figs. 5, 6 and 7, the scoop, the roller 10 and the inclined floor strip 18 are as already described. In place of a bristle brush such as shown at 12, I have illustrated in these figures a modified form of brush consisting of a cylinder 40 to which are secured on diametrically opposite sides brush elements consisting of sheets of resilient material 41, such as composite rubber and fabric sheets, of substantially semi-cylindrical form, on the free edges of which are a series of projecting fingers 42 which may be made of rubber or other resilient material, and which will sweep the berries upwardly and rearwardly in the scoop without bruising or injuring them. Instead of delivering the berries from the inclined floor board 18 to a hopper, as in the other forms of the machine, they pass from 18 directly to a traveling conveyer belt 43 provided with slats or buckets 44, and are delivered by said conveyer belt into a truck body, such as 34, Fig. 3, or other suitable receiver.

The operation of the machine will be sufficiently clear from the foregoing without material elaboration. As the apparatus is driven forward over the field or bog the vines, which are tough and wiry are drawn between the teeth 1 of the scoop, and are firmly held near their roots by the roller 10 which bears upon the vines under the weight of the apparatus, while the vines are drawn through the teeth with a combing action leaving the berries in the scoop. The brush, continuously rotated from the carriage wheel, sweeps the berries backward into the hopper from which they may be dumped or carried away by the conveyer to a receptacle, (Figs. 1, 2 and 3) or delivers the berries directly to the conveyer (Fig. 5).

I claim:

1. An apparatus for harvesting cranberries or the like, comprising a scoop having its bottom formed of a series of teeth spaced apart, and a roller positioned underneath the scoop and to the rear of the forward ends of the teeth, said rollers bearing upon plants in a continuous line transversely of the teeth and holding the plants against the ground while they are passing between the teeth.

2. An apparatus for harvesting cranberries or the like, comprising a scoop having its bottom formed of a series of teeth spaced apart, and a roller positioned underneath the scoop in proximity to the bases of the teeth, said rollers holding the plants against the ground on a continuous line transversely of the teeth while the plants are passing between the teeth.

3. An apparatus for harvesting cranberries or the like, comprising a scoop having its bottom formed of a series of teeth spaced apart, a roller positioned underneath the scoop and to the rear of the forward ends of the teeth, said roller holding the plants against the ground on a continuous line transversely of the teeth while the plants are passing between the teeth, said scoop being pivotally supported near its rear edge, and means to swing said scoop on its pivot to raise or lower it from or toward the ground.

4. An apparatus for harvesting cranberries or the like, comprising a scoop having its bottom formed of a series of teeth spaced apart, a roller positioned underneath the scoop and to the rear of the forward ends of the teeth, said roller holding the plants against the ground on a continuous line transversely of the teeth while the plants are passing between the teeth, and means within the scoop to sweep the berries rearwardly.

5. An apparatus for harvesting cranberries or the like, comprising a scoop having its bottom formed of a series of teeth spaced apart, a roller positioned underneath the scoop and to the rear of the forward ends of the teeth, said roller holding the plants against the ground on a continuous line transversely of the teeth while the plants are passing between the teeth, and a revolving brush within the scoop to sweep the berries rearwardly.

6. An apparatus for harvesting cranberries or the like, comprising a scoop having its bottom formed of a series of teeth spaced apart, a roller positioned underneath the scoop and to the rear of the forward ends of the teeth, said roller holding the plants against the ground on a continuous line transversely of the teeth while the plants are passing between the teeth, and a hopper located behind the scoop and adapted to receive the contents discharged from the scoop.

7. An apparatus for harvesting cranberries or the like, comprising a scoop having its bottom formed of a series of teeth spaced apart, a roller positioned underneath the scoop and to the rear of the forward ends of the teeth, said roller holding the plants against the ground on a continuous line transversely of the teeth while the plants are passing between the teeth, and a conveyer adapted to carry away the berries discharged rearwardly from the scoop.

8. An apparatus for harvesting cranberries or the like, comprising a scoop having its bottom formed of a series of teeth spaced apart, a roller positioned underneath the scoop and to the rear of the forward ends of the teeth, said roller holding the plants against the ground on a continuous line transversely of the teeth while the plants are passing between the teeth, a hopper located behind the scoop and adapted to receive the contents discharged from the scoop, and a conveyer entering the hopper and having means to carry away the contents of the hopper.

9. An apparatus for harvesting cranberries or the like, comprising a scoop having its bottom formed of a series of teeth spaced apart, a roller positioned underneath the scoop and to the rear of the forward ends of the teeth, said roller holding the plants against the ground on a continuous line transversely of the teeth while the plants are passing between the teeth, a hopper located behind the scoop and adapted to receive the contents discharged from the scoop, a conveyer entering the hopper and adapted to carry away the contents of the hopper, and a receiver located under the discharge end of the conveyer.

10. An apparatus of the character described comprising a set of forwardly pointing teeth, and a transverse roller positioned below the teeth, said roller holding the plants while they are drawn between the teeth against the ground on a continuous line transversely of the teeth.

11. An apparatus of the character described comprising a set of forwardly pointing teeth, a transverse roller positioned below the teeth, said roller holding the plants while they are drawn between the teeth on a continuous line against the ground, and connections between the set of teeth and the roller adapted to support the teeth on the roller and also to transmit to the roller downward pressure due to the pull of the plants between the teeth.

12. An apparatus of the character described comprising a set of pivoted forwardly pointing teeth, a transverse roller positioned below the teeth, said roller holding the plants while they are drawn between the teeth against the ground on a continuous line transversely of the teeth, and rigid brackets in which the roller is journaled, connected to the set of teeth and adapted to support the teeth on the roller and also to transmit to the roller downward pressure due to the pull of the plants between the teeth.

Signed by me at Boston, Massachusetts, this sixteenth day of October, 1916.

HORACE B. MAGLATHLIN.